United States Patent
Zhao

(10) Patent No.: US 12,495,425 B2
(45) Date of Patent: Dec. 9, 2025

(54) METHOD FOR PHYSICAL CHANNEL TRANSMISSION, AND CORRESPONDING TERMINAL DEVICE AND COMMUNICATION DEVICE

(71) Applicant: GUANGDONG OPPO MOBILE TELECOMMUNICATIONS CORP., LTD., Guangdong (CN)

(72) Inventor: Zhenshan Zhao, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 531 days.

(21) Appl. No.: 17/942,170

(22) Filed: Sep. 11, 2022

(65) Prior Publication Data

US 2023/0007682 A1 Jan. 5, 2023

Related U.S. Application Data

(63) Continuation of application No. PCT/CN2020/098283, filed on Jun. 24, 2020.

(30) Foreign Application Priority Data

May 29, 2020 (WO) ................ PCT/CN2020/093540

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC ............ H04W 72/23; H04W 72/0446; H04W 72/232; H04W 72/04; H04W 72/0453
See application file for complete search history.

(56) References Cited

U.S. PATENT DOCUMENTS

| | | | |
|---|---|---|---|
| 2019/0297629 A1 | 9/2019 | Lin et al. | |
| 2020/0120651 A1* | 4/2020 | Ma | H04L 1/0061 |
| 2020/0162208 A1 | 5/2020 | Moon et al. | |

(Continued)

FOREIGN PATENT DOCUMENTS

| | | |
|---|---|---|
| CN | 102301772 A | 12/2011 |
| CN | 103313417 | 9/2013 |

(Continued)

OTHER PUBLICATIONS

Office Action of India Counterpart Application, Application No. 202227060599, issued on Mar. 23, 2023, pp. 1-7.

(Continued)

*Primary Examiner* — Chandrahas B Patel
(74) *Attorney, Agent, or Firm* — Hodgson Russ LLP

(57) ABSTRACT

A method for physical channel transmission includes: a terminal device obtains first indication information, the first indication information being used to determine information of time domain resources corresponding to a first physical channel; the time domain resources of the first physical channel correspond to a first link direction; the time domain resources include time domain resources on N time units, N being an integer greater than 1; and the terminal device transmits the first physical channel by means of time domain resource on the N time units.

18 Claims, 5 Drawing Sheets

(56) References Cited

U.S. PATENT DOCUMENTS

| | | | |
|---|---|---|---|
| 2021/0266893 A1 | 8/2021 | Lee et al. | |
| 2022/0201715 A1* | 6/2022 | Wei | H04L 5/0051 |

FOREIGN PATENT DOCUMENTS

| | | |
|---|---|---|
| CN | 107223362 A | 9/2017 |
| CN | 109379782 | 2/2019 |
| CN | 109565350 | 4/2019 |
| CN | 110351848 | 10/2019 |
| CN | 110431896 | 11/2019 |
| CN | 110831159 A | 2/2020 |
| CN | 111030799 | 4/2020 |
| EP | 3911095 | 11/2021 |
| JP | 2015089023 | 5/2015 |
| WO | 2010133043 | 11/2010 |
| WO | 2020026708 | 2/2020 |
| WO | 2020027577 | 2/2020 |
| WO | 2020094133 | 5/2020 |

OTHER PUBLICATIONS

Oppo, "Resource allocation enhancements for NR URLLC", 3GPP TSG RAN WG1 #96 R1-1902423, Feb. 25-Mar. 1, 2019, pp. 1-3.
Oppo, "Remaining issues for cross-slot scheduling", 3GPP TSG RAN WG1 #100bis R1-2001769, Apr. 20-30, 2020, pp. 1-5.
"Search Report of of counterpart Europe application No. 20938373. 6", issued on Sep. 18, 2023, p. 1-p. 12.
"International Search Report (Form PCT/ISA/210) of PCT/CN2020/ 098283", mailed on Feb. 22, 2021, with English translation thereof, pp. 1-6.
"Written Opinion of the International Searching Authority (Form PCT/ISA/237) of PCT/CN2020/098283", mailed on Feb. 22, 2021, with English translation thereof, pp. 1-7.
3GPP, "3rd Generation Partnership Project;Technical Specification Group Radio Access Network;NR; Physical channels and modulation(Release 16)", 3GPP TS 38.211 V16.0.0, Dec. 2019, pp. 1-129.
3GPP, "3rd Generation Partnership Project;Technical Specification Group Radio Access Network;NR;Physical layer procedures for data(Release 16)", 3GPP TS 38.214 V16.0.0, Dec. 2019, pp. 1-147.
"Office Action of Europe Counterpart Application, Application No. 20938373.6", issued on Sep. 5, 2024, p. 1-p. 9.
"Notice of Allowance of China Counterpart Application, Application No. 202310064734.5", with English translation thereof, issued on Sep. 14, 2024, p. 1-p. 6.
"Office Action of Japan Counterpart Application, Application No. 2022-570410", with English translation thereof, issued on Oct. 1, 2024, p. 1-p. 9.
Qualcomm Incorporated, "PUSCH Enhancements for eURLLC", 3GPP TSG-RAN WG1 #99 R1-1912961, Nov. 18-22, 2019, pp. 1-7.
"Office Action of Japan Counterpart Application, Application No. 2022-570410", with English translation thereof, issued on Apr. 16, 2024, p. 1-p. 5.
"Office Action of Europe Counterpart Application, Application No. 20938373.6", issued on May 13, 2024, p. 1-p. 8.
"Office Action of China Counterpart Application, Application No. 202310064734.5", with English translation thereof, issued on Jun. 21, 2024, p. 1-p. 14.
IPI, Hearing Notice for IN Application No. 202227060599, Feb. 13, 2025.
WIPO, International Search Report issued in International Application No. PCT/CN2020/093540, Feb. 20, 2021.
WIPO, Written Opinion issued in International Application No. PCT/CN2020/093540, Feb. 20, 2021.
Intel Corporation, "Resource allocation and TBS," 3GPP TSG RAN WG1 Meeting #90bis, R1-1717393, Oct. 9-13, 2017, Prague, Czech Republic, 7.3.3.1.
Intel Corporation, "Support of flexible data channel durations," 3GPP TSG RAN WG1 #89, R1-1707402, May 15-19, 2017, Hangzhou, P.R. China, 7.1.3.3.1.
EPO, Third Office Action issued in European Application No. 20938373.6, Jan. 20, 2025.
Intel Corporation, "On resource reservation for forward compatibility," 3GPP TSG RAN WG1 Meeting #90, R1-1714084, Aug. 21-25, 2017, Prague, P. R. Czechia, 6.1.3.6.
EPO, Communication for EP Application No. 20938373.6, Jul. 1, 2025.
KIPO, Office Action for KR Application No. 10-2022-7039456, Jun. 21, 2025.
LG Electronics, "Discussion on physical layer structure for NR sidelink," 3GPP TSG RAN WG1 Meeting #100, R1-2000781, Feb. 2020.

* cited by examiner

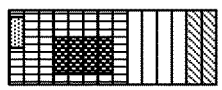

Time slot n

☒ PDCCH  ▨ PDSCH  ☰ Downlink symbol  ▧ Uplink symbol

FIG. 4A

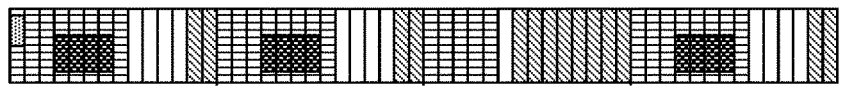

Time slot n　　Time slot n+1　　Time slot n+2　　Time slot n+3

☒ PDCCH  ▨ PDSCH  ☰ Downlink symbol  ▧ Uplink symbol

FIG. 4B

```
                                                            ┌─ S101
┌──────────────────────────────────────────────────────────┐
│   A terminal device obtains first indication information. The first
│ indication information is used to determine information of time domain
│ resources corresponding to a first physical channel. The time domain
│   resources of the first physical channel correspond to a first link
│  direction.  The time domain resources include time domain resources
│         on N time units, where N is an integer greater than 1.
└──────────────────────────────────────────────────────────┘
                               │
                                                            ┌─ S102
┌──────────────────────────────────────────────────────────┐
│  The terminal device transmits the first physical channel by means of
│             the time domain resources on the N time units.
└──────────────────────────────────────────────────────────┘
```

FIG. 5

```
                                                            ┌─ S201
┌──────────────────────────────────────────────────────────┐
│ The first communication device sends first indication information to the
│      terminal device, where the first indication information is used to
│      determine information of time domain resources corresponding to a
│  first physical channel. The time domain resources of the first physical
│  channel correspond to a first link direction.  The time domain resources
│  include time domain resources on N time units, where N is an integer
│  greater than 1. The terminal device transmits the first physical channel
│       by means of the time domain resources on the N time units
└──────────────────────────────────────────────────────────┘
```

FIG. 6

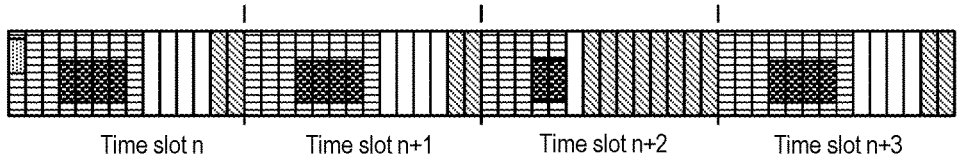

Time slot n　　Time slot n+1　　Time slot n+2　　Time slot n+3

☒ PDCCH  ▨ PDSCH  ☰ Downlink symbol  ▧ Uplink symbol  ☐ Guard period

FIG. 7

METHOD FOR PHYSICAL CHANNEL TRANSMISSION, AND CORRESPONDING TERMINAL DEVICE AND COMMUNICATION DEVICE

CROSS-REFERENCE TO RELATED APPLICATION

This application is a continuation of international application of PCT application serial no. PCT/CN2020/098283 filed on Jun. 24, 2020, which claims the priority benefit of PCT application serial no. PCT/CN2020/093540 filed on May 29, 2020. The entirety of each of the above mentioned patent applications is hereby incorporated by reference herein and made a part of this specification.

BACKGROUND

Technology Field

The application relates to the communication field, and particularly, to a data transmission method, a terminal device, and a network device.

Description of Related Art

In the fifth-generation mobile communication 5G new air interface NR system, the network schedules the transmission of physical channels through scheduling information. For example, the network can schedule the physical downlink shared channel (PDSCH) transmission of a single time slot through downlink control information (DCI) and can also schedule PDSCH transmission of multiple time slots through DCI. The network can configure a DCI to schedule multiple PDSCH transmission resources by configuring specific parameters. When the network does not configure such a parameter, one DCI only schedules PDSCH in one time slot, and when the parameter is configured and has a value greater than 1, one DCI schedules PDSCH in multiple time slots.

With the multi-slot scheduling or multi-slot transmission, the same transmission block is retransmitted multiple times in multiple time slots. This, on the one hand, can improve transmission reliability and reduce the overhead of scheduling signaling, but on the other hand, in the multi-slot transmission, the PDSCH in different time slots transmit the same transmission block, the same time-frequency resources are used for transmission in each time slot, so the position and the quantity of downlink time slot symbols in each time slot have to meet the requirements for transmitting the PDSCH, otherwise the time slot cannot be used for transmitting the PDSCH. In practice, this method of transmitting PDSCH in multiple time slots imposes strong requirements and restrictions on the structure of the time slot, which no longer meets the application requirements.

SUMMARY

In view of this, a data transmission method, a terminal device, and a network device capable of supporting a flexible resource scheduling method are provided in the embodiments of the application.

In an embodiment of the application, a data transmission method, applied to a terminal device, is provided and includes steps as follows.

The terminal device obtains first indication information. The first indication information is used to determine information of time domain resources corresponding to a first physical channel. The time domain resources of the first physical channel correspond to a first link direction; the time domain resources include time domain resources on N time units, where N is an integer greater than 1.

The terminal device transmits the first physical channel through the time domain resources on the N time units.

In an embodiment of the application, a data transmission method is provided and includes steps as follows.

A first communication device sends first indication information to a terminal device. The first indication information is used to determine information of time domain resources corresponding to a first physical channel. The time domain resources of the first physical channel correspond to a first link direction; the time domain resources comprise time domain resources on N time units, where N is an integer greater than 1; the time domain resources on the N time units are used for the terminal device to transmit the first physical channel.

In an embodiment of the application, a terminal device is further provided and includes the following.

A first obtaining module is configured to obtain first indication information. The first indication information is used to determine information of time domain resources corresponding to the first physical channel. The time domain resources of the first physical channel correspond to the first link direction; the time domain resources comprise time domain resources on N time units, where N is an integer greater than 1.

A transmitting module is configured to transmit the first physical channel through time domain resources on the N time units.

In an embodiment of the application, a communication device is further provided and includes the following.

A first sending module is configured to send first indication information to a terminal device. The first indication information is used to determine information of time domain resources corresponding to the first physical channel. The time domain resources of the first physical channel correspond to the first link direction, the time domain resources include time domain resources on N time units, and N is an integer greater than 1. The time domain resources on the N time units are used for the terminal device to transmit the first physical channel.

Optionally, the communication device includes a network device or a central control node.

In an embodiment of the application, a terminal device is further provided and includes a processor and a memory. The memory is configured to store a computer program, the processor calls and executes the computer program stored in the memory as well as the data transmission method.

In an embodiment of the application, a network device is further provided and includes a processor and a memory. The memory is configured to store a computer program, the processor calls and executes the computer program stored in the memory as well as the data transmission method.

In an embodiment of the application, a chip is further provided and includes a processor, configured to call and execute a computer program from a memory, so that a device installed with the chip is enabled to execute the data transmission method.

In an embodiment of the application, a computer-readable storage medium for storing a computer program is further provided. The computer program enables a computer to execute the data transmission method.

In an embodiment of the application, a computer program product is further provided and includes computer program instructions. The computer program instructions enable a computer to execute the data transmission method.

In an embodiment of the application, a computer program is provided. The computer program enables a computer to execute the data transmission method.

Data transmission is performed with the method in the embodiment of the application, and the time domain symbols in time units such as time slots are not strictly regulated or limited. The data channel does not need to have the same time domain position in each time unit. By adopting the embodiments of the application, the resource scheduling method can be more flexible, and the mapping of data channels to resources can be more flexible.

BRIEF DESCRIPTION OF THE DRAWING

FIG. 4A and FIG. 4B are diagrams illustrating the comparison between time slot structures corresponding to two configuration parameters when the time slot structure requirements are not met.

FIG. 5 is a flowchart of a data transmission method on the terminal side according to an embodiment of the application.

FIG. 6 is a flowchart of a data transmission method on the network side or the central control node side according to an embodiment of the application.

FIG. 7 is a schematic view of a time slot structure for transmission by some time domain symbols in a time unit according to an embodiment of the application.

DESCRIPTION OF THE EMBODIMENTS

Figure 1:
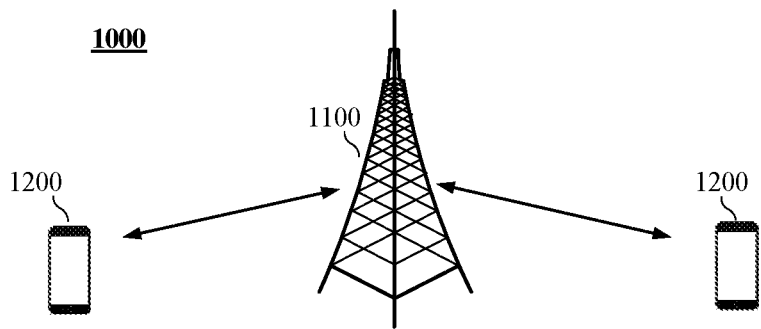
FIG. 1 is a schematic view of an architecture of a wireless communication system according to an embodiment of the application.

The technical solutions in the embodiments of the application are illustrated below with reference to the accompanying drawings in the embodiments of the application.

The technical solutions of the embodiments of the application can be applied to various communication systems, such as global system of mobile communication (GSM) system, code division multiple access (CDMA) system, wideband code division multiple access (WCDMA) system, general packet radio service (GPRS) system, long term evolution (LTE) system, advanced long term evolution (LTE-A) systems, new radio (NR) system, evolution system of NR system, LTE-based access to unlicensed spectrum (LTE-U) system on unlicensed spectrum, NR-based access to unlicensed spectrum (NR–U) system on unlicensed spectrum, non-terrestrial networks (NTN) systems, universal mobile telecommunication system (UMTS), wireless Local Area Networks (WLAN), wireless fidelity (WiFi), 5th-generation (5G) communication system or other communication systems, and the like.

Generally speaking, conventional communication systems support a limited number of connections and are easy to implement. However, with the development of communication technology, the mobile communication system may support not only traditional communication but also communication, such as device to device (D2D) communication, machine to machine (M2M) communication, machine type communication (MTC), vehicle to vehicle (V2V) communication, vehicle to everything (V2X) communication, communication between in-vehicle devices, communication in smart home scenarios or smart city communication, and the like. The embodiments of the application can also be applied to these communication systems.

Optionally, the communication system in this embodiment of the application may be applied to a carrier aggregation (CA) scenario, to dual connectivity (DC) scenarios, and to standalone (SA) meshing scenarios as well.

In the embodiments of the application, various embodiments with reference to a network device and a terminal device, as well as a central control node and a terminal device are illustrated. The terminal device may also be referred to as user equipment (UE), an access terminal, a subscriber unit, a subscriber station, a mobile station, a movable station, a remote station, a remote terminal, mobile equipment, a user terminal, a terminal, wireless communication device, a user agent or a user device, etc.

The terminal device can be a station (ST) in the WLAN, a cellular phone, a cordless phone, a session initiation protocol (SIP) phone, a wireless local loop (WLL) station, a personal digital assistant (PDA) device, a handheld device with wireless communication function, a computing device or other processing device connected to wireless modems, an in-vehicle device, a wearable device, an end device in next-generation communication systems such as NR networks, or a terminal device in a public land mobile network (PLMN) network that evolves in the future.

In the embodiments of the application, the terminal device can be deployed on land, including indoors or outdoors, in a handheld, wearable, or vehicle-mounted mode; it can also be deployed on water (e.g., on ships, and the like); it can also be deployed in the air (e.g., in airplanes, balloons, satellites, and the like).

In the embodiments of the application, the terminal device may be a mobile phone, a pad, a computer with wireless transceiver, a virtual reality (VR) terminal device, an augmented reality (AR) terminal device, an industrial control wireless terminal device, a self driving wireless terminal device, a remote medical wireless terminal device, a smart grid wireless terminal device, a wireless terminal device in transportation safety, a wireless terminal device in a smart city, or a wireless terminal device in a smart home, etc.

As an example but not a limitation, in the embodiments of the application, the terminal device may also be a wearable device. The wearable device can also be referred to a wearable smart device, a general term for an intelligent design of daily wear and the development of wearable devices using wearable technology, such as glasses, gloves, watches, clothing and shoes. The wearable device is a portable device directly put on the body or integrated into the clothing or accessories of a user. The wearable device is not only a hardware device but also an implementation of powerful functions through software support, data interaction, and cloud interaction. In a broad sense, the wearable smart device includes full functions, large sizes. The wearable smart device can achieve complete or partial functions without relying on smart phones, such as smart watches or smart glasses, and the like. Moreover, the wearable smart device only focuses on a certain type of application function, and it requires to be used in conjunction with other devices such as smart phones, such as various types of smart bracelets and smart jewelry for physical monitoring.

In the embodiments of the application, the network device may be a device for communicating with a mobile device. The network device can be an access point (AP) in WLAN, a base transceiver station (BTS) in GSM or CDMA, can also be a NodeB (NB) in WCDMA, and can also be an evolutional Node B (eNB or eNodeB) in LTE, or relay station or access point, or in-vehicle devices, wearable devices, and network devices (gNBs) in NR networks or network device in the PLMN network that evolves in the future.

As an example but not a limitation, in the embodiments of the application, the network device may have the characteristics of mobility. For example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station disposed in a location such as on land or water.

In the embodiments of the application, the network device may provide services for the cell. The terminal device communicates with the network device through the transmission resources (e.g., frequency domain resources, or spectrum resources) used by the cell. The cell may be a cell corresponding to a network device (e.g., a base station), which may belong to a macro base station and may also belong to a base station corresponding to a small cell. The small cells may include metro cells, micro cells, pico cells, femto cells, etc., and these small cells have the characteristics of small coverage and low transmit power and are suitable for providing high-speed data transmission services.

FIG. 1 schematically illustrates a network device 1100 and two terminal devices 1200. Optionally, the wireless communication system 1000 may include multiple network devices 1100, and the coverage of each network device 1100 may include terminal devices in other quantity, which are not limited in the embodiment of the application. Optionally, the wireless communication system 1000 shown in FIG. 1 may further include other network entities such as a mobility management entity (MME), access and mobility management function (AMF), which is not limited by the embodiment of the application.

Figure 2:
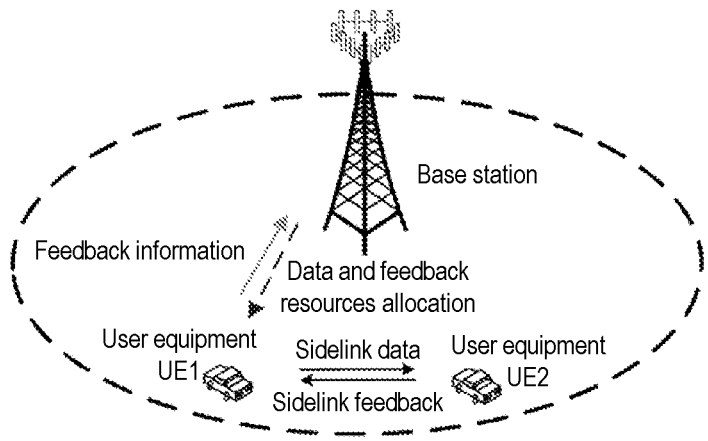
FIG. 2 is a schematic view of an architecture of a sidelink communication system according to an embodiment of the application.

FIG. 2 is a schematic view illustrating the sidelink transmission performed by a sender terminal and a receiver terminal in an NR-V2X system. In unicast or multicast of NR-V2X system, for transmission manner 1, the transmission resources of the side link are allocated by the network device. The network device allocates resources for sidelink data transmission to the sender terminal and transmission resources for reporting sidelink feedback information, such as physical uplink control channel (PUCCH) transmission resources. The sender sends sidelink data to the receiver on the sidelink transmission resources allocated by the network device, which may include physical sidelink control channel (PSCCH) and physical sidelink shared channel (PSSCH). The receiver sends the sidelink feedback information of the sidelink data to the sender terminal, the feedback resources of the sidelink may be allocated by the network or determined according to the transmission resources of the sidelink data, and the sender terminal receives the sidelink feedback information and sends the sidelink feedback information to the network on the uplink resources allocated by the network.

For a central control node or a cluster head (CH) terminal in a communication group, sidelink transmission resources can be allocated to other terminals in the group. Specifically, the central control node has one of the following functions: responsible for establishing a communication group; joining and leaving of group members; executing resource coordination, allocating sidelink transmission resources for other terminals, and receiving sidelink feedback information from other terminals; resource coordination with other communication groups; and the like. If the sender terminal sends a resource request to the cluster head (CH) terminal, the cluster head (CH) terminal allocates sidelink transmission resources to the sender terminal, and the sender terminal sends sidelink data to the receiver terminal on the allocated resources. If the sidelink feedback is activated, the receiver terminal can send the sidelink feedback information according to the detection state of the sidelink data.

The embodiments of the application can be applied to the scenarios or systems of sidelink transmission as follows.

1. Internet of Vehicles System

In the Internet of Vehicles system, the network can allocate sidelink transmission resources to the terminal device, and the network can allocate transmission resources of multiple time slots to the terminal, that is, schedule the terminal to send sidelink data in multiple consecutive time slots (or subframes).

2. Home or Indoor Scenarios

In the smart home scenario, the terminal in the home or indoors has the communication function. A communication group can be formed from the terminals in the family, and the communication group usually has a central control node or a cluster head (CH) terminal, such as a smart phone, smart TV, and customer premise equipment (CPE). Terminals in the same family form a communication group, and the central control node (or the cluster head (CH) terminal) can allocate transmission resources to other terminals, so the central control node can allocate transmission resources of multiple time slots to other terminals.

3. In-Vehicle Communication Scenarios

A variety of terminal devices, such as speakers, stereos, cameras, rear-view mirrors, etc., are included in the vehicle. These terminal devices can be controlled through the central control node in the vehicle. A terminal in a vehicle constitutes a communication group or a communication system, and the central control node can allocate transmission resources to other terminals in the vehicle, so it can allocate transmission resources of multiple time slots.

It should be understood that the terms "system" and "network" are often used interchangeably herein. The term "and/or" herein is only an association relationship to describe associated objects, indicating that there can be three kinds of relationships. For example, being on A and/or B may mean three situations: A is present alone, both A and B are present, or B is present alone. In addition, the punctuation mark "/" herein generally indicates an "or" relationship between the antecedent object and the succeeding object connected by the mark.

To clearly illustrate the idea of the embodiments of the application, a brief description of the resource scheduling processing process in the communication system is illustrated first.

In the NR system, for multi-slot transmission or multi-slot scheduling, the network can configure the number of times of repeated data transmission by configuring the parameter pdsch-AggregationFactor. If the network configures the parameter pdsch-AggregationFactor, the network transmits multiple PDSCHs in multiple consecutive time slots, the multiple PDSCHs transmit the same transmission block (TB), and the multiple PDSCHs have the same or different redundancy versions and are repeated transmissions of the transmission blocks.

Figure 3A:
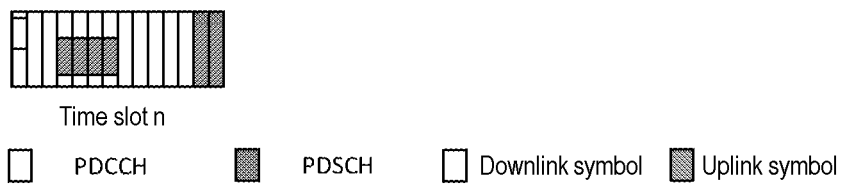
FIG. 3A and FIG. 3B are diagrams illustrating the comparison between time slot structures corresponding to two configuration parameters when the time slot structure requirements are met.
Figure 3B:
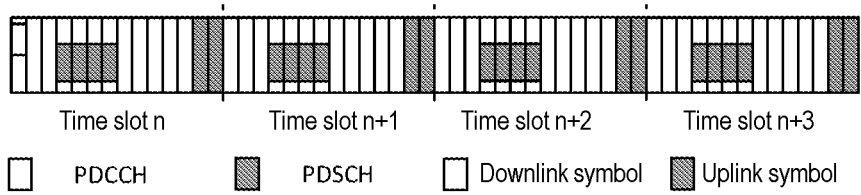

FIG. 3A and FIG. 3B are diagrams illustrating the comparison between time slot structures corresponding to two configuration parameters when the time slot structure requirements are met. In FIG. 3A, the figure illustrates that only one PDSCH is scheduled for a physical downlink control channel (PDCCH) when no pdsch-AggregationFactor is configured.

FIG. 3B illustrates that one PDCCH schedules PDSCHs in four consecutive time slots when pdsch-AggregationFactor=4 is configured, and the PDSCHs in these four consecutive time slots occupy the same resource symbols. Specifically, the starting time domain symbol position of the time domain resource allocated for PDSCH in FIG. 3B is the fourth symbol, PDSCH occupies four time domain symbols, then the time domain symbols occupied by the PDSCH in one time slot are 3, 4, 5, and 6, and in four consecutive time slots, the PDSCH occupies the same time domain resource.

FIG. 4A and FIG. 4B are a diagram illustrating the comparison between time slot structures corresponding to two configuration parameters when the time slot structure requirements are not met. In a time slot n, a time slot n+1, and a time slot n+3, four time domain symbols (3, 4, 5, 6) are the downlink direction, which meets the requirements and belongs to the available time domain symbols. However, in slot n+2, time domain symbol 6 is configured as the uplink direction, which fails to meet the requirements and belongs to the unavailable time domain symbol, so the time slot n+2 cannot be used to transmit the PDSCH, that is, all the time domain symbols in the time slot n+2 are unavailable. Even if the symbols 3 and 4 are in the downlink direction, they are also unavailable. In fact, there is a certain degree of waste of resources.

In view of this, in an embodiment of the application, a data transmission method, applied to a terminal device, is provided. Referring to FIG. 5, the method includes steps as follows.

In step S101, a terminal device obtains first indication information, where the first indication information is used to determine information of a time domain resource corresponding to a first physical channel; the time domain resource of the first physical channel corresponds to the first link direction; the time domain resources include time domain resources on N time units, where N is an integer greater than 1.

In step S102, the terminal device transmits the first physical channel by using the time domain resources on the N time units.

In the embodiment of the application, the time domain resource corresponding to the first physical channel is indicated by the first indication information, and the link direction of the indicated time domain resource is a specific link direction, such as uplink, downlink or sidelink. The indicated time domain resources include time domain resources on N time units. During transmission, the terminal device transmits the first physical channel through the time domain resources on the N time units indicated by the first indication information, and the first physical channel may be an uplink channel, a downlink channel, or a side channel, for example.

Note that the uplink, downlink, or sidelink in the embodiment is only used to identify or distinguish the transmission direction of the link. For example, the uplink is used to identify the direction in which the terminal sends data to the network, or the direction in which the terminal sends data to the central control node device; the downlink is used to identify the direction in which the network sends data to the terminal, or the direction in which the central control node device sends data to the terminal; the sidelink is used to identify the direction in which data is sent between two terminals.

Accordingly, with the method of the embodiment of the application for data transmission, factors affecting the transmission are only the link direction of the time domain resources and the total number of time domain resources, that is, N time units. Situations, such as time domain symbols, in the time unit are not regulated or limited, so the embodiment of the application does not limit the frame structure of the system. The data channel does not need to have the same time domain location in each time unit nor to have the same number of time domain symbols for a specific link direction. With the embodiments of the application, the resource scheduling method can be more flexible, and the mapping of data channels to resources can be more flexible.

In the embodiment of the application, optionally, the time domain resources in multiple time units (i.e., N time units) indicated by the indication information are used to jointly transmit one data channel, instead of transmitting multiple data channels separately (e.g., ye first physical channel is repeatedly transmitted in different time slots).

Correspondingly, in an embodiment of the application, a data transmission method, applied to a network device or a central control node device, is further provided. Referring to FIG. 6, the method includes steps as follows.

In step S201, the first communication device sends first indication information to the terminal device, where the first indication information is used to determine the information of the time domain resource corresponding to the first physical channel. The time domain resources of the first physical channel correspond to the first link direction. The time domain resources include time domain resources on N time units, where N is an integer greater than 1. The time domain resources on the N time units are used for the terminal device to transmit the first physical channel.

Optionally, the first communication device may be a network device or a device with resource scheduling function, such as a cluster head (CH) terminal or a central control node in a communication group.

In the embodiment of the application, the network device or the central control node may provide the terminal device with the first indication information, so that the terminal device can transmit the data channel according to the first indication information. The data channels do not have to have the same time domain position in each time unit, and the resource scheduling method can be more flexible with the embodiments of the application.

Specific implementations of the embodiments of the application are illustrated in detail through several embodiments in the subsequent paragraphs.

In the embodiment of the application, various manners may be adopted to determine the number N of time units, which is introduced separately in the subsequent paragraphs. The term "number" mentioned refers to the "number/quantity" of the described objects, and the two are interchangeable.

In manner 1, the first indication information determines the number of time units.

In the embodiment of the application, optionally, the first indication information includes that the number of time units corresponding to the first physical channel is N.

Optionally, the time unit includes at least one of the following: a time slot, a subframe, a half frame, a radio frame, a system frame, and a time length T. The time length T refers to a fixed time length, such as 1 ms, 2 ms, and the like. Note that the time unit may be the basic unit of resource scheduling.

Note that in different communication systems, the basic unit of resource scheduling has different names. For example, in the LTE system, it is called a subframe; in the NR system, it is called a time slot; and in an in-vehicle short-range communication system, it is called a radio frame, etc. In each embodiment of the application, it is applicable to the basic unit of resource scheduling, and there is no distinction due to different names. For the convenience of description, in different embodiments, it is sometimes described by time slots, sometimes by subframes, and sometimes by radio frames, which has no impact on the specific implementation of the embodiments of the application.

In the embodiment of the application, the first indication information may be carried by at least one of the following information: broadcast information, system information, configuration information, and scheduling information.

In one example, the network device schedules the PDSCH (or PUSCH) through downlink control information (DCI), and the first indication information may be carried in the DCI; in another example, the first indication information may be carried by system information broadcast (SIB), radio resource control (RRC), physical broadcast channel (PBCH) which are configured through configuration information.

Specifically, in the example in which the scheduling information carries the first indication information, the network device or the central control node sends scheduling information to the terminal device. The scheduling information is used to schedule transmission of the first data channel, and the scheduling information carries the first indication information. The first indication information is used to schedule transmission resources on N time units for the terminal device. The resources in the N time units are used to transmit the first data channel.

In manner 2, the first indication information and the first configuration information jointly determine the number of time units.

In the embodiment of the application, optionally, the terminal device determines a first parameter set according to the first configuration information, and the first parameter set includes one or more parameter values; the first indication information includes first index information; the terminal device determines the number of time units corresponding to the first physical channel according to the first parameter set and the first index information.

Optionally, the first configuration information is determined according to at least one of the following information: pre-configuration information, network configuration information, and central control node configuration information.

When the number of time units is jointly determined, on the one hand, a parameter set can be configured through pre-configuration, network configuration, or central control node, and multiple parameter values in the parameter set respectively correspond to the number of multiple scheduled time units (e.g., the number of time slots); on the other hand, an index value may be indicated in the DCI, and the number of time units to be scheduled is determined according to the index value and the parameter set.

For example, the network device configures a parameter set through a signaling, such as RRC or SIB, and the parameter values in the set are 1, 2, 4, 8, 16, 32, etc. The index value indicated in the DCI is 2, the index number starts from 0, and the number of time units to be scheduled is the value corresponding to the index value of 2 in the parameter set, that is, 4 in the corresponding parameter set. Therefore, it is determined that the number of time units to be scheduled is 4, that is N=4.

The case of indicating other parameter sets or index values can be deduced by analogy; the carrying mode of the first indication information and the optional definition of the time unit are consistent with the description in "manner 1".

In manner 3, the first indication information and the second configuration information jointly determine the number of time units.

In the embodiment of the application, optionally, the terminal device determines the minimum granularity information of the time units according to the second configuration information; the first indication information includes a first number; the terminal device determines the number of time units corresponding to the first physical channel according to the minimum granularity information and the first number.

Optionally, the second configuration information is determined according to at least one of the following information: pre-configuration information, network configuration information, and central control node configuration information.

When the number of time units is jointly determined, on the one hand, the minimum granularity of the time unit is scheduled by pre-configuration, network configuration, or central control node configuration. For example, the minimum granularity can be 4 time slots (or radio frames, etc.), 8 time slots, etc. On the other hand, the indication information in the control information indicates a multiple of the minimum granularity of the time unit, and the number of time units to be scheduled is determined according to the multiple value and the minimum granularity parameter value.

For example, the minimum granularity of the scheduled time slots configured by the network through the RRC signaling is 2, and the indicated multiple value in the DCI is 4, indicating that the number of time slots corresponding to the 4 minimum scheduling time units is 2×4=8 time slots. Therefore, it is determined that the number of time units to be scheduled is 8, that is, N=8.

The case of indicating the remaining minimum granularity or multiples can be deduced in the same way; the carrying mode of the first indication information and the optional definition of the time unit are consistent with the description in "manner 1"

In manner 4, the first indication information and the third configuration information jointly determine the number of time units.

In the embodiment of the application, optionally, the terminal device determines the number of time domain symbols of the first link direction included in each time unit according to the third configuration information; the first indication information includes that the number of time domain symbols used for transmitting the first physical channel is K; the terminal device determines the number of time units corresponding to the first physical channel according to the first indication information and the number of time domain symbols of the first link direction included in each time unit.

Optionally, the third configuration information is determined according to at least one of the following information: pre-configuration information, network configuration information, and central control node configuration information.

When the number of time units is jointly determined, on the one hand, the number of time domain symbols of the first link direction included in each time unit may be configured by pre-configuration, network configuration, or central control node, such as 4 downlink symbols are included in time slot n+1,
0 downlink symbols are included in time slot n+2,
1 downlink symbol is included in time slot n+3,
2 downlink symbols are included in time slot n+4.

On the other hand, the indication information in the control information indicates that the number of downlink symbols used for PDSCH transmission is K, and the number of time units to be scheduled can be determined according to the above value.

For example, assuming that K=7 is indicated in the DCI, that is, the PDSCH is mapped to a total of 7 time domain symbols, starting from the time slot n+1, the available downlink symbols are occupied, involving a total of 3 time slots (time slots n+1, n+3, n+4), so N=3, and it is determined that the number of time units to be scheduled is 3.

Assuming that K=5 is indicated in the DCI, that is, the PDSCH is indicated to be mapped to 5 symbols, then a total of 2 time slots (slots n+1 and n+3) are involved, the PDSCH is only mapped to the time slots n+1 and n+3, that is, N=2, and it is determined that the number of time units to be scheduled is 2.

Assuming that K=6 is indicated in the DCI, that is, the PDSCH is mapped to a total of 6 time domain symbols, then starting from the time slot n+1 listed above, the available downlink symbols are fully occupied, involving a total of 3 time slots (time slots n+1, n+3, n+4), where only the first downlink symbol in the time slot n+4 is used, so N=3, and it is determined that the number of time units to be scheduled is 3.

The manner of determining the remaining cases can be deduced by analogy; the carrying mode of the first indication information and the optional definition of the time unit are consistent with the description in "manner 1".

In manner 5, the first indication information and the fourth configuration information jointly determine the number of time units.

In the embodiment of the application, optionally, the terminal device determines the number A of time domain symbols used for transmitting the first physical channel in a single time unit according to the fourth configuration information. Moreover, the terminal device determines the number of time domain symbols of the first physical channel is B according to the fifth configuration information and determines the type of the first physical channel according to the first indication information. The terminal device determines the number of time units corresponding to the first physical channel according to the first indication information, the fourth configuration information, and the fifth configuration information.

Optionally, the terminal device determines starting positions of the A time domain symbols according to the fourth configuration information.

Optionally, the fourth configuration information is determined according to at least one of the following information: pre-configuration information, network configuration information, and central control node configuration information; the fifth configuration information is determined according to at least one of the following information: pre-configuration information, network configuration information, and central control node configuration information.

Optionally, the fourth configuration information and the fifth configuration information are the same configuration information.

Optionally, the first indication information may be carried by at least one of the following information: broadcast information, system information, configuration information, and scheduling information.

For example, the first indication information is used to instruct the terminal to transmit a control channel, the fourth configuration information is used to determine that there is 1 time domain symbol in a time unit for transmitting the control channel, the fifth configuration information is used to determine that the number of time domain symbols of the control channel is 4, and then the terminal can determine that the number of time units corresponding to the control channel is N=4.

In any one of the foregoing manners, N time units for transmitting the first physical channel may be determined. Furthermore, the starting time slot of the first physical channel may be the first time domain position or may be a position at a certain interval from the first time domain position. In the embodiment of the application, the starting position of the time domain resource corresponding to the first physical channel may be determined by the second indication information, which is illustrated in detail in the subsequent paragraphs.

In the embodiment of the application, the terminal device obtains the second indication information, and the second indication information is used to determine the starting position of the time domain resource corresponding to the first physical channel.

Optionally, the second indication information is carried by at least one of the following information: broadcast information, system information, configuration information, and scheduling information.

In an implementation of the application, optionally, the second indication information includes an index of a starting time slot and/or an index of a starting symbol of the first physical channel.

In an embodiment of the application, optionally, the second indication information includes a time slot interval and/or a symbol interval between the starting position of the first physical channel and the first time domain position.

In an embodiment of the application, optionally, the second indication information includes a time slot interval and/or a symbol index between the starting position of the first physical channel and the first time domain position.

The first time domain location includes at least one of the following:
 a) the time domain position where the scheduling information of the first physical channel is located;
 b) the time domain position where the channel carrying the first indication information is located;
 c) the time domain position where the channel carrying the second indication information is located;

d) the starting position for a fixed length of time, such as the starting position of a time length of 1 ms.

Accordingly, in the embodiment of the application, the time domain resources on the N time units include time domain resources on the N time units starting from the starting position. The N time units may be consecutive N time units or discrete N time units.

In practice, different time slots may include different numbers of uplink symbols and/or downlink symbols and may also include time domain symbols served as guard period (GP) or transmission and reception conversion, and the like. Therefore, for the time domain resources in the N time units from the starting position described in the embodiments of the application, it requires to exclude the time units that cannot be used for transmitting the first physical channel, which can be implemented in the embodiment of the application by manners as follows.

In manner 1, if the link direction of all the time domain symbols in the first time unit of the N time units starting from the starting position is not the first link direction, the first time unit is not included in the N time units.

In manner 2, if the second time unit in the N time units starting from the starting position includes reserved symbols, and the link directions of all the remaining time domain symbols except the reserved symbols are not the first link direction, the second time unit is not included in the N time units.

In some embodiments of the application, each of the N time units includes at least one time domain symbol of the first link direction.

In some embodiments of the application, the time domain symbols except the reserved symbols in each of the N time units include at least one time domain symbol of the first link direction.

In some embodiments of the application, at least one time unit in the N time units does not include a time domain symbol of the first link direction.

In some embodiments of the application, time domain symbols except the reserved symbols in at least one of the N time units do not include time domain symbols of the first link direction.

For reserved symbols, the terminal device in the embodiment of the application may determine the time domain resources of the reserved symbols according to the sixth configuration information. The sixth configuration information may be determined according to at least one of the following information: pre-configuration information, network configuration information, and central control node configuration information.

In the embodiment of the application, the reserved symbols are used to transmit at least one of the following information: synchronization signal, broadcast channel, system information, control information, access information, channel sounding signal, and information of a specific service type. The specific type of information is information for reducing noise, for example.

In addition to the various time unit structures described, the N time units starting from the starting position in the embodiment of the application may be discontinuous N time units, and there is an interval between two adjacent time units.

In an embodiment of the application, the terminal device obtains third indication information, where the third indication information is used to determine that one time unit in every R time units is used for transmitting the first physical channel, where R is an integer greater than 1.

The time domain resources on the N time units include time domain resources on the N time units starting from the starting position, and the interval between the i-th time unit and the i+1-th time unit in the N time units is R time units, where i is the serial number of the time unit, and $1 \leq i \leq N-1$.

In the embodiment of the application, the third indication information may be carried by at least one of the following information: broadcast information, system information, configuration information, and scheduling information.

Based on one or more of the embodiments described, the terminal device in the embodiment of the application may transmit a data channel selectively in at least one of the manners as follows.

The first physical channel is transmitted through all time domain symbols of the first link directions in the N time units.

The first physical channel is transmitted through all time domain symbols of the first link direction except the reserved symbols in the N time units.

The first physical channel is transmitted through the K time domain symbols of the first link direction in the N time units.

The first physical channel is transmitted through the A time domain symbols of the first link direction in each of the N time units.

In the embodiment of the application, referring to FIG. 7, the first physical channel may be transmitted by some time domain symbols in one time unit. Compared to the existing processing method in FIG. 4A and FIG. 4B, there are not enough downlink symbols in the time slot n+2 in FIG. 4A and FIG. 4B, and this time slot is not used for transmitting physical channels. However, in the embodiment of the application shown in FIG. 7, two downlink time domain symbols at corresponding positions in time slot n+2 and downlink time domain symbols in other time slots may be used to jointly transmit a physical channel.

In an embodiment of the application, the terminal device determines a time domain symbol of the first link direction for transmitting the first physical channel in the N time units according to at least one of the following information: the fourth indication information, the fifth indication information, and the sixth configuration information.

The fourth indication information is used to determine the starting positions and the number of time domain symbols of the first link direction in one time unit for transmitting the first physical channel.

The fifth indication information is used to determine the time domain position of the time domain symbol of the first link direction in a time unit.

The sixth configuration information is used to determine the time domain resources of reserved symbols.

In an embodiment of the application, the fourth indication information may be carried in the DCI and indicates the starting position and the number of time domain symbols in a radio frame. In the example in FIG. 7, the fourth indication information indicates that four symbols starting from the fourth time domain symbol in each time unit are used for transmitting the first physical channel.

In an embodiment of the application, the fifth indication information is symbol allocation information in a radio frame and indicates the number and/or position of symbols in the first link direction and the second link direction in a radio frame. In the example in FIG. 7, the location and number of downlink symbols DL and the location and number of uplink symbols UL in each time slot are determined according to the symbol allocation information.

In an embodiment of the application, a time domain symbol of the first link direction used for transmitting the first physical channel in the N time units is determined according to the fourth indication information and the fifth indication information. As an example, the intersection of the time domain symbols of the first link direction determined by the two pieces of indication information may be taken, and the first physical channel is transmitted by the time domain symbols in the intersection. For example, in FIG. 7, the fourth indication information indicates that 4 symbols starting from the 4th time domain symbol in each time slot are used to transmit the first physical channel. The fifth indication information is used to indicate the symbol ratio of each time slot, and the intersection determined according to the fourth indication information and the fifth indication information, that is, the symbols with symbol indices 3, 4, 5, and 6 (symbol indices in a slot start from 0) in time slots n, n+1, and n+3 and the symbols with the symbol indices 3 and 4 in the slot n+2 are used to transmit the first physical channel.

In an embodiment of the application, on the basis of the fourth indication information and the fifth indication information, the sixth configuration information is further combined to determine the time domain symbol of the first link direction in the N time units for transmitting the first physical channel. As an example, in the mentioned intersection of the time domain symbols of the first link direction determined by the fourth and fifth indication information, except the reserved resources determined by the sixth configuration information, the first physical channel is transmitted on the remaining time domain symbols. In the example in FIG. 7, on the basis of the example in the previous paragraph, if the network configures the last two available downlink symbols in a time slot as reserved symbols through the sixth configuration information, the symbols cannot be used to transmit the first physical channel. Meanwhile, the symbols with the symbol indices 3, 4, and 5 in the time slots n, n+1, and n+3 can be used to transmit the first physical channel, the symbol with the symbol index 6 is a reserved symbol, and the symbols with symbol indices 3 and 4 in the time slot n+2 are reserved symbols and cannot be used to transmit the first physical channel. Meanwhile, the first physical channel is transmitted through symbols with symbol indices 3, 4, and 5 in time slots n, n+1, and n+3.

According to at least one implementation described, in the embodiment of the application, the terminal device transmits the first physical channel through the time domain symbols of the first link direction in the N time units for transmitting the first physical channel.

Optionally, the fourth indication information and the fifth indication information may be respectively carried by at least one of the following information: broadcast information, system information, configuration information, and scheduling information. For example, the fourth indication information is resource scheduling information, which is carried in a control channel, and the fifth indication information is broadcast information.

In the embodiment of the application, the time slot ratios of each time slot of the time domain resources may be the same or different, that is, the transmission of data channel can be implemented without strictly limiting the time slot structure.

The implementations of the embodiments of the application are illustrated with reference to the accompanying drawings by multiple specific examples in the subsequent paragraphs.

Embodiment 1

Figure 8A:
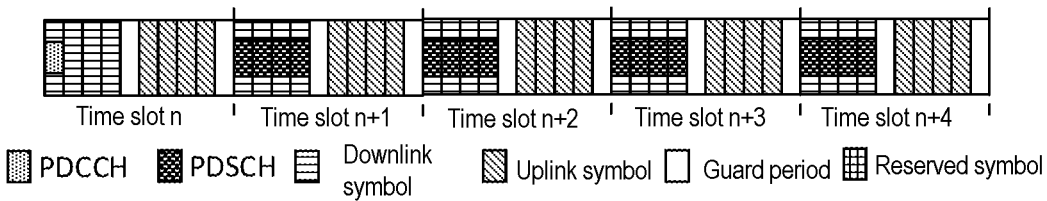
FIG. 8A and FIG. 8B are schematic views of time slot structures with each time slot in a same time slot configuration ratio according to an embodiment of the application.
Figure 8B:
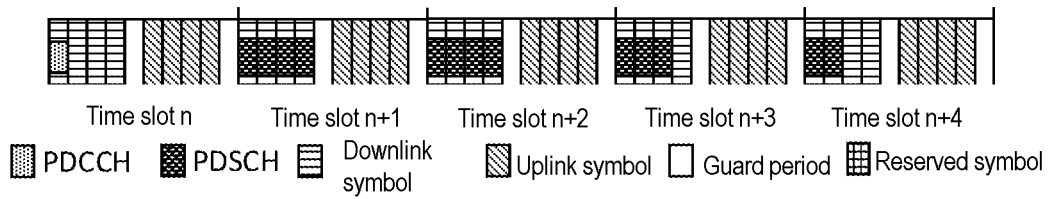

Referring to FIG. 8A and FIG. 8B, in the embodiment, the time slot ratio of each time slot is the same. Each time slot (or radio frame) includes 10 time domain symbols, where 2 time domain symbols are served as guard period or transmission and reception conversion, and the remaining 8 symbols can be used for data transmission. Four of the eight symbols for data transmission are used to transmit downlink data, such as transmission from the base station to a terminal device, or from the central control node device to other terminal devices; the remaining 4 symbols are used to transmit uplink data, such as transmission from the terminal device to the base station or to the central control node.

In the embodiment, the scheduling information sent in a time slot n+0, such as indication information carried in DCI, is used to indicate the scheduling of transmission resources such as PDSCH.

Specifically, FIG. 8A illustrates the case of scheduling according to the time slot granularity, and the number of time units corresponding to the PDSCH indicated in the DCI is N=4. That is, the PDSCH scheduled by the DCI occupies all downlink symbols in the 4 time slots. The 4 time slots (time slots n+1, n+2, n+3, and n+4) in FIG. 8A include a total of 16 downlink symbols, and the PDSCH occupies the same frequency domain resources on the 16 time domain symbols.

FIG. 8B illustrates the case of scheduling according to the granularity of time domain symbols, and N=14 is indicated in the DCI. That is, the PDSCH scheduled by the DCI occupies 14 consecutive downlink symbols, involving 4 time slots (time slots n+1, n+2, n+3, n+4), the first 2 downlink symbols in time slot n+4 are occupied, and the last 2 downlink symbols are not occupied; if N=16 is indicated, all downlink symbols may be occupied.

Furthermore, in the example in FIG. 8A, the network schedules the PDSCH through the DCI, and N=4 is indicated in the DCI. That is, the time domain resources of 4 consecutive time slots are scheduled for transmitting the PDSCH, and the size of the frequency domain resource is indicated as 10 RBs, then the transmission block TB corresponding to the PDSCH after channel coding and modulation is mapped to the time-frequency resources in the order of the frequency domain first and then the time domain. That is, the transmission block TB is first mapped on the 10 RBs of the first downlink symbol of time slot n+1, then mapped to 10 RBs on the second downlink symbol of slot n+1, and so on, until the 4 downlink symbols of time slot n+1 are mapped. Next, the transmission block TB is mapped to the first symbol of time slot n+2, then mapped to the second symbol of time slot n+2, and so on, until all downlink symbols on all four time slots are mapped.

Optionally, the control information DCI carries second indication information, where the second indication information is used to determine the starting position of the time domain resource of the data channel scheduled by the control information.

Optionally, the second indication information may indicate an index of a starting time slot and/or an index of a starting time domain symbol of the data channel.

Optionally, the second indication information may indicate a time slot interval and/or a symbol interval between the data channel and the control information.

Optionally, the second indication information may indicate a time slot interval and/or a symbol index between the data channel and the control information.

For example, the second indication information is carried by the DCI, and the DCI may include a parameter M, where the parameter M is used to determine the starting position of the time domain of the data channel.

For the scheduling of time slot granularity, the parameter M represents the starting position of the time slot of the scheduled data channel and the time slot interval of the time slot where the DCI is located. For example, in FIG. 8A, the parameter is M=1.

For the scheduling of symbol granularity, the parameter M represents the symbol interval between the starting position of the time domain symbol of the scheduled data channel and the time domain symbol where the DCI is located. For example, in FIG. 8B, the parameter is M=4.

If the parameter is M=0, it represents that the DCI and the scheduled data channel are located in the same time slot, and meanwhile the scheduled data channel is the same as the starting time domain symbol of the DCI, or the scheduled data channel starts from the next time domain symbol of the last time domain symbol where the DCI is located.

Optionally, the parameter M may include a time slot interval parameter and a time domain symbol index, the time slot interval parameter is used to determine the time slot interval between the data channel and the time slot where the DCI is located, and the time domain symbol index is used to determine the time domain symbol index corresponding to the starting slot symbol in the starting time slot of the data channel. For example, in FIG. 8B, the time slot interval is 1, the time domain symbol index is 0, and this represents that the first time domain symbol in the next time slot of the time slot where the DCI is located starts to map or transmit the PDSCH.

Embodiment 2

Figure 9A:
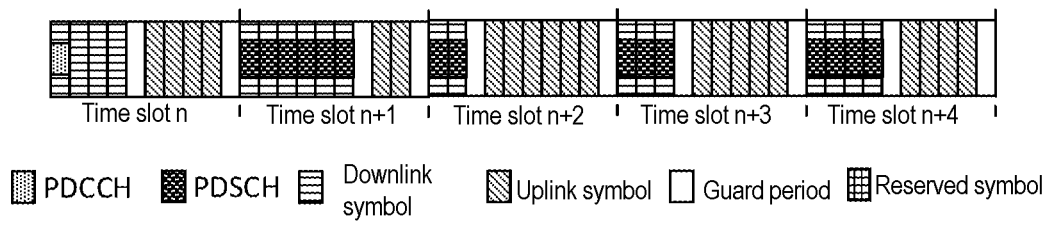
FIG. 9A and FIG. 9B are schematic views of time slot structures with each time slot in different time slot configuration ratios according to an embodiment of the application.
Figure 9B:
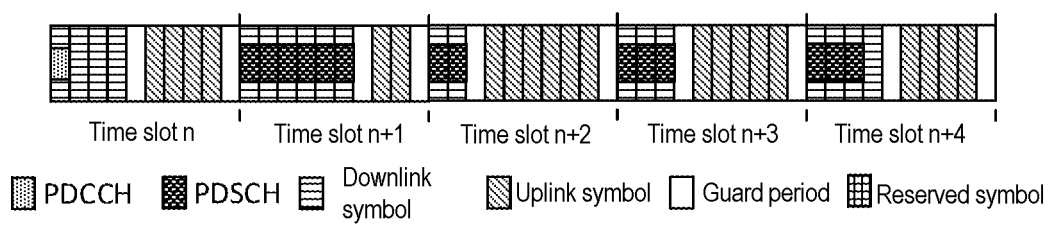

Referring to FIG. 9A and FIG. 9B, in the embodiment, the time slot ratio of each time slot is different. Each time slot (or radio frame) includes 10 time domain symbols, where 2 time domain symbols are served as guard period or transmission and reception conversion, and the remaining 8 symbols can be used for data transmission, which are further illustrated as follows.

In the time slot n+1, 6 downlink symbols and 2 uplink symbols are included.

In the time slot n+2, 2 downlink symbols and 6 uplink symbols are included.

In the time slot n+3, 3 downlink symbols and 5 uplink symbols are included.

In the time slot n+4, 4 downlink symbols and 4 uplink symbols are included. The scheduling information sent in the time slot n+0, such as the scheduling information sent in DCI, is used to schedule the transmission of PDSCH.

FIG. 9A illustrates the case of scheduling according to the time slot granularity, and N=4 is indicated in the DCI. That is, the PDSCH scheduled by the DCI occupies all the downlink symbols in the 4 time slots, so the four time slots in FIG. 9A include a total of 15 downlink symbols, and the PDSCH occupies the same frequency domain resources on the 15 time domain symbols.

FIG. 9B illustrates the case of scheduling according to the symbol granularity, and N=14 is indicated in the DCI. That is, the PDSCH scheduled by the DCI occupies 14 consecutive downlink symbols.

In addition, the manner of indicating the transmission resources of the data channel scheduled by the DCI in the DCI is the same as that described in Embodiment 1, which is not repeated herein.

In various embodiments of the application, if a certain time domain symbol has been reserved for transmission of other data channels or data types or system information in a time slot (or radio frame), the data channel is not mapped onto the reserved symbols.

Embodiment 3

Figure 10A:
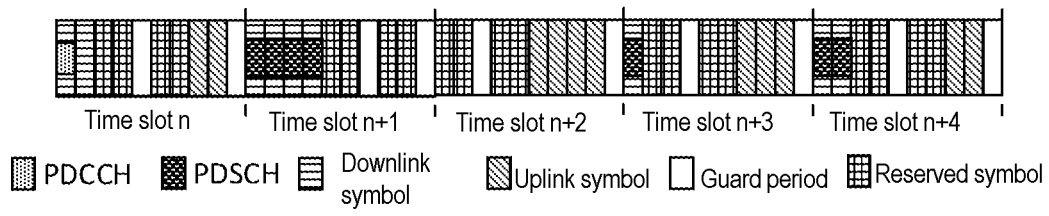
FIG. 10A and FIG. 10B are schematic views of time slot structures including reserved symbols in a time slot according to an embodiment of the application.
Figure 10B:
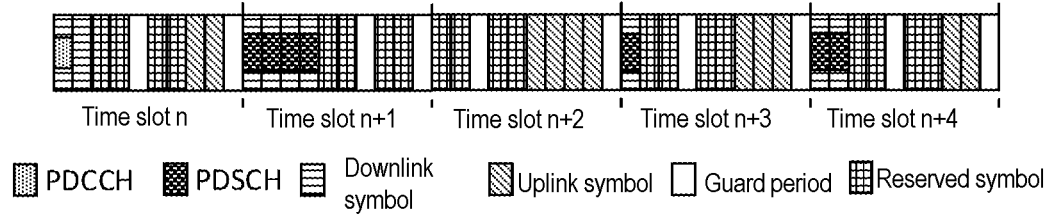

Referring to FIG. 10A and FIG. 10B, in each time slot, 2 downlink symbols and 2 uplink symbols are used as reserved symbols, and the reserved symbols can be used to transmit system information, control information, and the like or to transmit data of special types of services, such as service data of noise reduction in in-vehicle communication systems.

When the downlink data transmission is scheduled through the DCI, the downlink data cannot occupy the reserved symbols, and data mapping and transmission can only be performed on the downlink symbols that are not reserved in the time slot.

FIG. 10A illustrates the case of scheduling according to the time slot granularity, and parameter N=4 is indicated in the DCI. That is, the PDSCH scheduled by the DCI occupies all the downlink symbols in the four time slots, and the PDSCH is mapped to the unreserved time domain symbols in each time slot. Furthermore, note that since there are no downlink symbols available for mapping the PDSCH on the time slot n+2, the PDSCH is not mapped on the time slot n+2.

Note that for the embodiments of the application, the number of time slots to which the parameter N indicated in the DCI applies has nothing to do with whether the PDSCH is mapped in the time slot. In other words, for a time slot n+j, regardless of whether there is a time domain symbol that can map a data channel scheduled by DCI in this time slot, this time slot n+j is included in the indicated N time slots.

Referring to FIG. 10A, N=4 indicates that the PDSCH is mapped into 4 time slots, although there is no downlink symbol that can map the PDSCH in time slot n+2, N=4 is also applicable to this time slot n+2. That is, the PDSCH is mapped to the time domain symbols in the time slots n+1, n+2, n+3, and n+4. Therefore, the PDSCH is mapped to a total of 7 time domain symbols in the 4 time slots.

FIG. 10B illustrates the case of scheduling according to symbol granularity. For symbol-level mapping, if it is indicated in the control channel to map to 7 symbols, the PDSCH is mapped to a total of 7 symbols of time slots n+1, n+3, and n+4, if it is indicated to map to 5 symbols, the PDSCH is only mapped to time slots n+1 and n+3.

In the various embodiments described herein, each embodiment of the application is applicable for downlink data transmission, uplink data transmission, or sidelink data transmission.

Data transmission is performed with the method in the embodiment of the application, and the time domain symbols in time units such as time slots are not strictly regulated or limited. The data channel does not need to have the same time domain position in each time unit. By adopting the embodiments of the application, the resource scheduling method can be more flexible, and the mapping of data channels to resources can be more flexible.

The specific configurations and implementations of the embodiments of the application have been illustrated through multiple embodiments from different perspectives. With at least one of the embodiments, the effect is illustrated.

Figure 11:
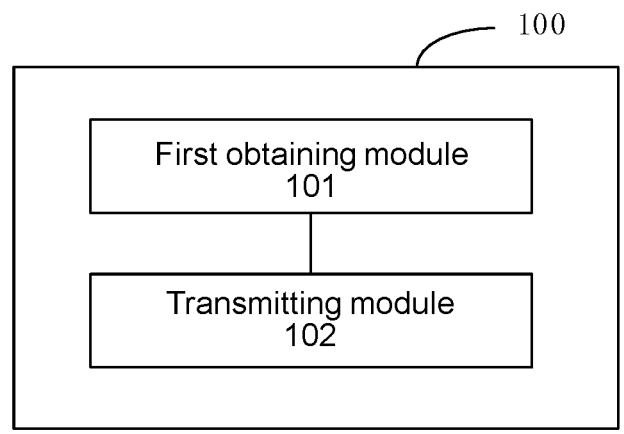
FIG. 11 is a schematic structural block diagram of a terminal device according to an embodiment of the application.

Corresponding to the processing method of at least one of the foregoing embodiments, in an embodiment of the application, a terminal device 100 as shown in FIG. 11 is provided, and the terminal device 100 includes the following.

A first obtaining module 101 is configured to obtain first indication information, where the first indication information is used to determine information of time domain resources corresponding to the first physical channel; the time domain resources of the first physical channel correspond to the first link direction; the time domain resources include time domain resources on N time units, where N is an integer greater than 1.

A transmitting module 102 is configured to transmit the first physical channel through time domain resources on the N time units.

Figure 12:
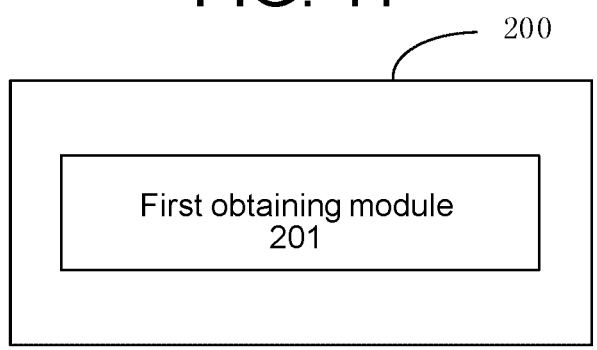
FIG. 12 is a schematic structural block diagram of a network device or a central control node according to an embodiment of the application.

Corresponding to the processing method of at least one of the foregoing embodiments, in an embodiment of the application, a network device 200 as shown in FIG. 12 is provided, and the network device 200 includes the following.

A first sending module 201 is configured to send first indication information to a terminal device, where the first indication information is used to determine information of time domain resources corresponding to the first physical channel; the time domain resources of the first physical channel correspond to the first link direction, the time domain resources include time domain resources on N time units, and N is an integer greater than 1; the time domain resources on the N time units are used for the terminal device to transmit the first physical channel.

Figure 13:
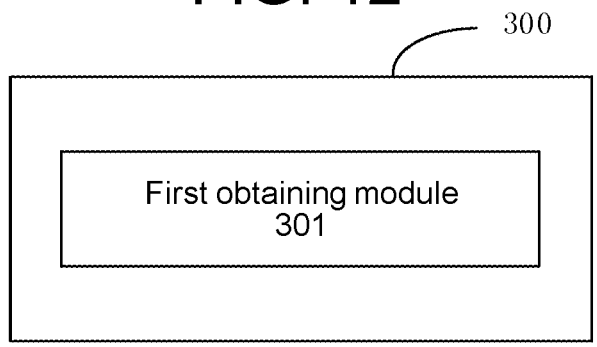
FIG. 13 is a schematic structural block diagram of a network device or a central control node according to an embodiment of the application.

Corresponding to the processing method of at least one of the foregoing embodiments, in an embodiment of the application, a central control node 300 as shown in FIG. 13 is provided, and the central control node 300 includes the following.

A first sending module 301 is configured to send first indication information to a terminal device, where the first indication information is used to determine information of time domain resources corresponding to the first physical channel; the time domain resources of the first physical channel correspond to the first link direction, the time domain resources include time domain resources on N time units, and N is an integer greater than 1; the time domain resources on the N time units are used for the terminal device to transmit the first physical channel.

The terminal device 100, the network device 200, and the central control node 300 in the embodiments of the application can implement the corresponding functions of the terminal device in the foregoing method embodiments. For the corresponding processes, functions, implementations and beneficial effects of each module (a sub-module, a unit, or a component, etc.) in the terminal device 100, the network device 200 and the central control node 300, refer to the corresponding descriptions in the foregoing method embodiments, which is not repeated herein.

Note that the functions described by the each module (the submodule, the unit, or the component, etc.) in the terminal device 100, the network device 200, and the central control node 300 in the embodiments of the application may be implemented by different modules (submodules, units, or components, etc.) and can also be implemented by the same module (a submodule, a unit, or a component, etc.). For example, the first sending module and the second sending module may be different modules but may also be the same module, which both can implement the corresponding functions of the terminal device in the embodiments of the application.

Figure 14:
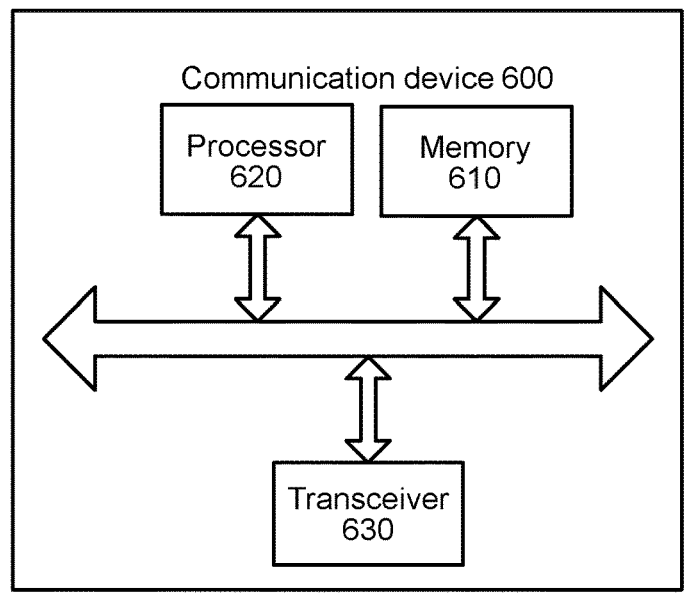
FIG. 14 is a schematic block diagram of a communication device according to an embodiment of the application.

FIG. 14 is a schematic view of a structure of a communication device 600 according to an embodiment of the application. The communication device 600 includes a processor 610, and the processor 610 can call and run a computer program from a memory to implement the methods in the embodiments of the application.

Optionally, the communication device 600 may also include a memory 620. The processor 610 may call and run a computer program from the memory 620 to implement the methods in the embodiments of the application.

The memory 620 may be a separate device independent of the processor 610 or may be integrated in the processor 610.

Optionally, the communication device 600 may further include a transceiver 630, and the processor 610 may control the transceiver 630 to communicate with other devices. Specifically, the transceiver 630 may send information or data to other devices or receive information or data sent by other devices.

The transceiver 630 may include a transmitter and a receiver. The transceiver 630 may further include antennas, and the number of the antennas may be one or plural.

Optionally, the communication device 600 may be the network device of the embodiments of the application, and the communication device 600 may implement the corresponding processes implemented by the network device in each method of the embodiments of the application, which is not repeated herein for conciseness.

Optionally, the communication device 600 may be a terminal device of the embodiments of the application, and the communication device 600 may implement the corresponding processes implemented by the terminal device in each method in the embodiments of the application, which is not repeated herein for conciseness.

Figure 15:
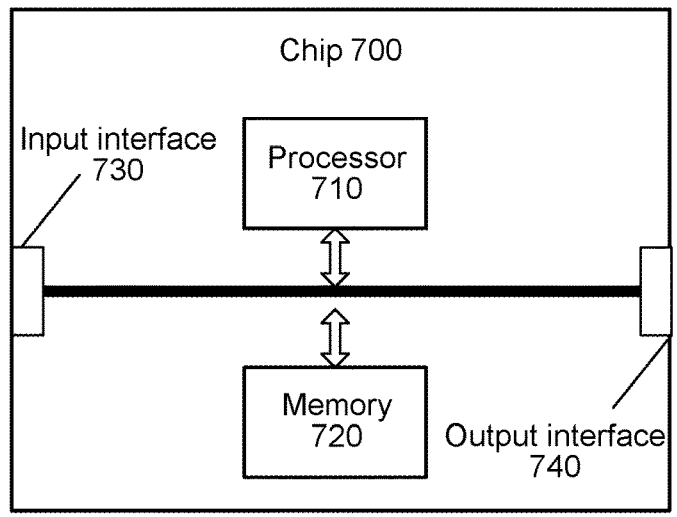
FIG. 15 is a schematic block diagram of a chip according to an embodiment of the application.

FIG. 15 is a schematic view of a structure of a chip 700 according to an embodiment of the application. The chip 700 includes a processor 710, and the processor 710 can call and run a computer program from a memory to implement the method in the embodiment of the application.

Optionally, the chip 700 may further include a memory 720. The processor 710 may call and run a computer program from the memory 720 to implement the methods in the embodiments of the application.

The memory 720 may be a separate device independent of the processor 710 or may be integrated in the processor 710.

Optionally, the chip 700 may further include an input interface 730. The processor 710 may control the input interface 730 to communicate with other devices or chips, and specifically, the input interface 730 may acquire information or data sent by other devices or chips.

Optionally, the chip 700 may further include an output interface 740. The processor 710 may control the output interface 740 to communicate with other devices or chips, and specifically, the output interface 740 may output information or data to other devices or chips.

Optionally, the chip can be applied to the network device of the embodiments of the application, and the chip can implement the corresponding processes implemented by the network device in each method of the embodiments of the application, which is not repeated herein for conciseness.

Optionally, the chip can be applied to the terminal device in the foregoing embodiments of the application, and the chip can implement the corresponding processes implemented by the terminal device in each method of the embodiments of the application, which is not repeated herein for conciseness.

Note that the chip mentioned in the embodiments of the application may also be referred to as system on a chip, system-on-a-chip, and system-on-chip, or the like.

The processor can be a general-purpose processor, a digital signal processor (DSP), a field programmable gate array (FPGA), an application specific integrated circuit (ASIC) or other programmable logic devices, transistor logic devices, discrete hardware components, etc. The general-purpose processor may be a microprocessor, any conventional processor, or the like.

The memory may be either volatile memory or non-volatile memory or may include both volatile and non-volatile memory. The non-volatile memory can be read-only memory (ROM), programmable ROM (PROM), erasable PROM (EPROM), electrically EPROM (EEPROM), or flash. Volatile memory may be random access memory (RAM).

Note that the memory is an illustration and is not limited thereto. For example, the memory in the embodiment of the application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and so on. That is, the memory in the embodiments of the application is intended to include but not limited to these and any other suitable types of memory.

Figure 16:
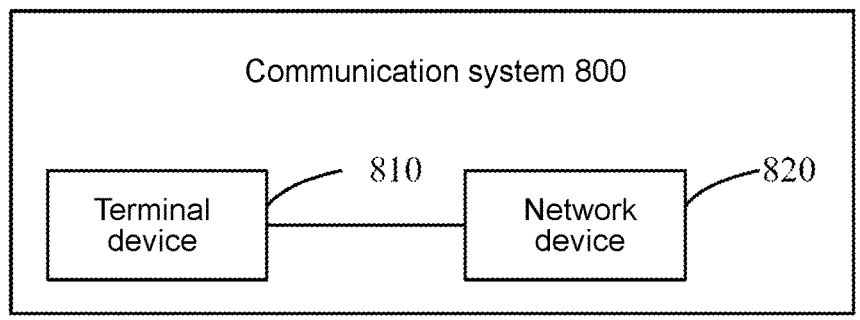
FIG. 16 is a schematic block diagram of a communication system according to an embodiment of the application.

FIG. 16 is a schematic block diagram of a communication system 800 according to an embodiment of the application. The communication system 800 includes a terminal device 810 and a network device 820.

The terminal device 810 may be used to implement the corresponding functions implemented by the terminal device in the methods of the various embodiments of the application, and the network device 820 may be used to implement the corresponding functions implemented by the network device in the methods of the various embodiments of the application, which are not repeated herein for conciseness.

In the embodiments of the application, the indication information indicates that the data channel can be mapped to all available downlink symbols (or uplink symbols) in multiple time slots, there is no restriction on the frame structure of the system, the data channel does not need to have the same time domain position in each time slot, so flexible mapping of data channels to resources and methods to support flexible resource scheduling are implemented.

The foregoing embodiments may be implemented in whole or in part by software, hardware, firmware, or any combination thereof. When implemented in software, the embodiments can be implemented in whole or in part in the form of a computer program product. The computer program product includes one or more computer instructions. When the computer program instructions are loaded and executed on a computer, all or part of the processes or functions described in the embodiments of the application are generated. The computer may be a general purpose computer, a special purpose computer, a computer network, or other programmable device. The computer instructions may be stored in a computer-readable storage medium or transmitted from one computer-readable storage medium to another computer-readable storage medium. For example, the computer instructions may be transmitted from a website site, computer, server or data center to another website site, computer, server or data center via a wired method (e.g., coaxial cable, fiber optic, digital subscriber line (DSL)) or a wireless method (e.g., infrared, wireless, microwave, and the like). The computer-readable storage medium can be any available medium that can be accessed by a computer or a data storage device such as a server, data center, and the like that includes an integration of one or more available media. The available media may be magnetic media (e.g., floppy disks, hard disks, and magnetic tapes), optical media (e.g., DVDs), or semiconductor media (e.g., solid state disks (SSDs)), and the like.

Note that in various embodiments of the application, the sequence numbers of the foregoing processes do not represent the time order of execution, and the time order of the execution of each process should be determined by its functions and internal logic and shall not impose any limitation to the embodiments of the application.

Those skilled in the art can clearly understand that, for the convenience and conciseness of description, for the specific working process of the described systems, devices and units, refer to the corresponding processes in the foregoing method embodiments, which is not repeated herein.

The above are only specific implementations of the application, and the protection scope of the application is not limited thereto. All changes or replacements within the technical scope disclosed in the application that those persons skilled in the art can easily conceive should be covered within the protection scope of the application. Therefore, the protection scope of the application shall be subject to the protection scope of the claims.

What is claimed is:

1. A data transmission method, applied to a terminal device, the method comprising:
    obtaining first indication information by the terminal device, the first indication information being used to determine information of time domain resources corresponding to a first physical channel; wherein the time domain resources of the first physical channel correspond to a first link direction; the time domain resources comprise time domain resources on N time units, where N is an integer greater than 1;
    transmitting the first physical channel by the terminal device through the time domain resources on the N time units;
    wherein the step of transmitting the first physical channel through the time domain resources comprises:
        transmitting the first physical channel by the terminal device through all time domain symbols of the first link direction except time domain resources of reserved symbols in the N time units.

2. The data transmission method according to claim 1, wherein
    a time unit comprises at least one of the following: a time slot, a subframe, a half frame, a radio frame, a system frame, and a time length T.

3. The data transmission method according to claim 1, wherein
    the first indication information comprises that a number of time units corresponding to the first physical channel is N.

4. The data transmission method according to claim 1, further comprising:
    obtaining second indication information by the terminal device, wherein the second indication information is used to determine starting positions of the time domain resources corresponding to the first physical channel.

5. The data transmission method according to claim 4, wherein the second indication information comprises an index of a starting time slot and/or an index of a starting symbol of the first physical channel, or the second indication information comprises a time slot interval and/or a symbol interval between a starting position of the first physical channel and a first time domain position;

or the second indication information comprises a time slot interval and/or a symbol index between the starting position of the first physical channel and the first time domain position;

wherein the first time domain position comprises at least one of the following:

a time domain position where scheduling information of the first physical channel is located;

a time domain position where a channel carrying the first indication information is located;

a time domain position where a channel carrying the second indication information is located;

a starting position for a fixed length of time.

6. The data transmission method according to claim 4, wherein the time domain resources on the N time units comprises time domain resources on the N time units starting from the starting position.

7. The data transmission method according to claim 6, wherein each of the N time units comprises at least one time domain symbol of the first link direction; or the time domain symbols except reserved symbols in each of the N time units comprise at least one time domain symbol of the first link direction.

8. The data transmission method according to claim 7, further comprising:

determining, by the terminal device, the time domain resources of the reserved symbol according to sixth configuration information.

9. The data transmission method according to claim 1, further comprising:

determining time domain symbols of the first link direction in the N time units for transmitting the first physical channel by the terminal device.

10. The data transmission method according to claim 9, wherein the terminal device determines the time domain symbols of the first link direction for transmitting the first physical channel in the N time units according to at least one of the following information: fourth indication information, fifth indication information, sixth configuration information; wherein the fourth indication information is used to determine starting positions and a number of time domain symbols of the first link direction in one time unit for transmitting the first physical channel;

the fifth indication information is used to determine a time domain position of a time domain symbol of the first link direction in one time unit;

the sixth configuration information is used to determine time domain resources of reserved symbols.

11. A terminal device, comprising:

a processor, configured to obtain first indication information, wherein the first indication information is used to determine information of time domain resources corresponding to the first physical channel; wherein the time domain resources of the first physical channel correspond to the first link direction; the time domain resources comprise time domain resources on N time units, where N is an integer greater than 1;

a transceiver, configured to transmit the first physical channel through time domain resources on the N time units;

wherein in order to transmit the first physical channel through time domain resources on the N time units, the transceiver is configured to:

transmit the first physical channel by the terminal device through all time domain symbols of the first link direction except time domain resources of reserved symbols in the N time units.

12. A communication device, comprising:

a transceiver, configured to send first indication information to a terminal device, wherein the first indication information is used to determine information of time domain resources corresponding to the first physical channel; wherein, the time domain resources of the first physical channel correspond to the first link direction, the time domain resources include time domain resources on N time units, and N is an integer greater than 1; the time domain resources on the N time units are used for the terminal device to transmit the first physical channel;

wherein the transceiver is further configured to send sixth configuration information to the terminal device, wherein the sixth configuration information is used to determine time domain resources of reserved symbols.

13. The communication device according to claim 12, wherein the time units comprise at least one of the following: a time slot, a subframe, a half frame, a radio frame, a system frame, and a time length T.

14. The communication device according to claim 13, wherein the first indication information comprises that a number of time units corresponding to the first physical channel is N.

15. The communication device according to claim 12, wherein the transceiver is further configured to send second indication information to the terminal device, where the second indication information is used to determine the starting position of the time domain resource corresponding to the first physical channel.

16. The communication device according to claim 15, wherein the second indication information comprises an index of a starting time slot and/or an index of a starting symbol of the first physical channel, or the second indication information comprises a time slot interval and/or a symbol interval between a starting position of the first physical channel and a first time domain position;

or the second indication information comprises the time slot interval and/or a symbol index between the starting position of the first physical channel and the first time domain position;

wherein the first time domain location comprises at least one of the following:

a time domain position where the scheduling information of the first physical channel is located;

a time domain position where a channel carrying the first indication information is located;

a time domain position where a channel carrying the second indication information is located;

a starting position for a fixed length of time.

17. The communication device according to claim 15, wherein the time domain resources on the N time units comprise time domain resources on the N time units starting from the starting position.

18. The communication device according to claim 17, wherein each of the N time units comprises at least one time domain symbol of the first link direction; or the time domain symbols except the time domain symbols of the reserved symbols in each of the N time units comprise at least one time domain symbol of the first link direction.

\* \* \* \* \*